July 16, 1935.  W. H. FOSTER  2,008,012
FLUID PRESSURE OPERATED MACHINE TOOL
Filed May 18, 1929   5 Sheets-Sheet 3

Inventor:
William H. Foster.

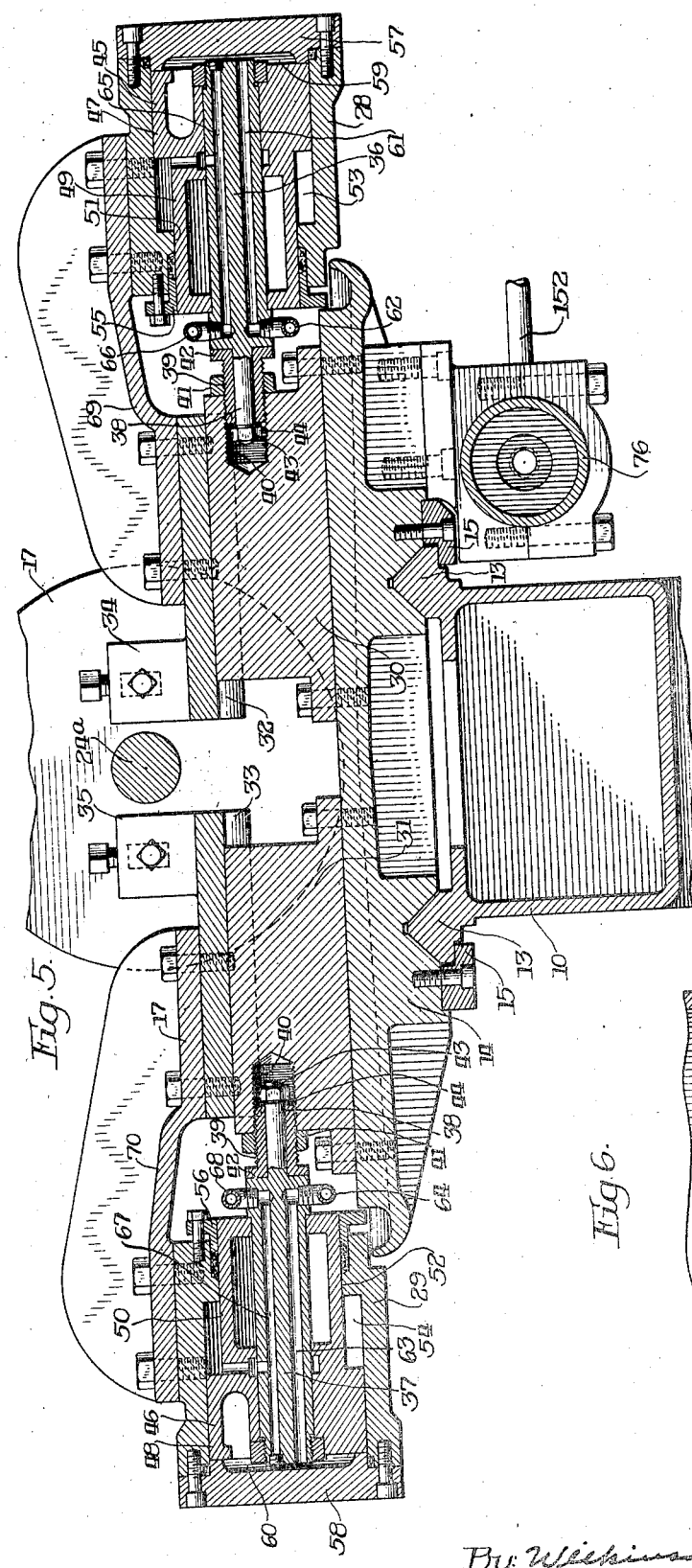
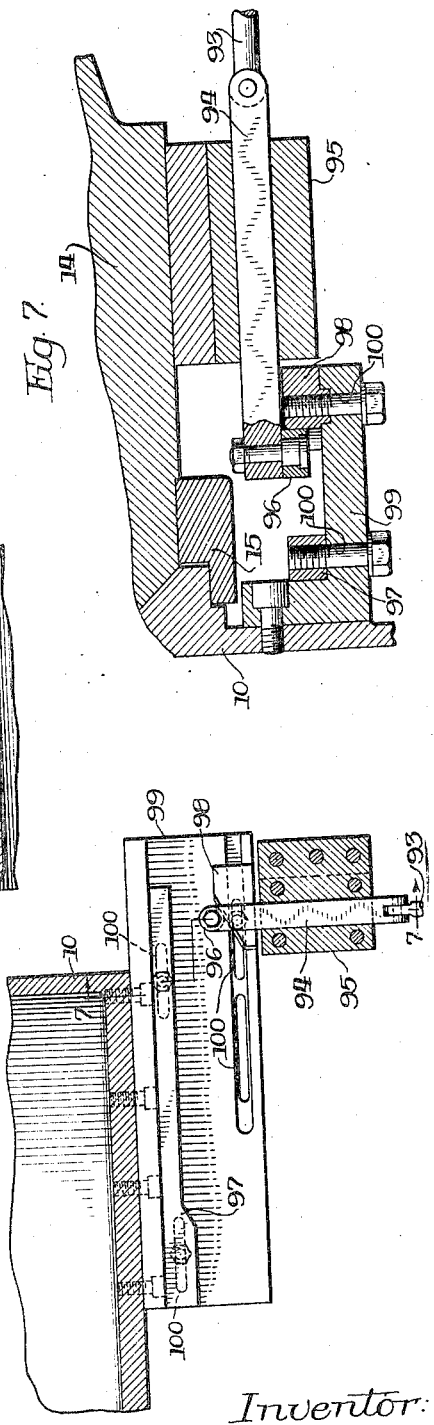
Fig. 5.
Fig. 6.
Fig. 7.
Inventor:
William H. Foster.

Patented July 16, 1935

2,008,012

UNITED STATES PATENT OFFICE 2,008,012

FLUID PRESSURE OPERATED MACHINE TOOL

William H. Foster, Elkhart, Ind.

Application May 18, 1929, Serial No. 364,110

40 Claims. (Cl. 29—27)

The present invention relates to fluid pressure operated machine tools.

Though the invention will be described particularly with reference to lathes, it will appear as the description proceeds that the invention has a broader application. A description of the present invention in connection with lathes will be sufficient, it is thought, for a complete disclosure.

In the operation of machine tools and other mechanisms in which a single source of fluid pressure is used for communicating movement to a plurality of movable members, difficulties have been encountered in controlling the distribution of force to said movable members, many factors, including the matter of leakage of the fluid medium, presenting serious problems. The fluid medium which is at present preferred is oil, and when the term "fluid medium" is used in the present specification it will be understood that oil is a preferred embodiment thereof.

An object of the present invention is to provide a machine tool or other mechanism having parts which must be positively moved in predetermined relationship with one another, which machine tool or other mechanism is provided with control means whereby the movements of said parts may be accurately predetermined.

A further object is to provide a machine tool or the like having a plurality of relatively movable parts, together with fluid pressure (preferably oil pressure), means for positively moving said parts, said machine tool or the like being provided with means for insuring that said relatively movable parts will move according to a predetermined relationship with one another.

A further and more specific object is to provide a fluid pressure operated lathe or the like having a reciprocable platen carrying a plurality of slides which may be moved relative to said platen, together with fluid pressure responsive means for operating said platen and said slides with a predetermined relationship between said slides and said platen.

A further object is to provide a lathe or the like having a plurality of fluid pressure operated tool carrying means adapted to be operated from a common source of pressure, which lathe or the like will operate automatically according to a predetermined cycle of operation of said tool carrying members.

A further object is to provide an improved fluid pressure lathe having a plurality of fluid pressure operated tool carrying slides in which the use of flexible fluid pressure connections is minimized or eliminated.

Further objects will appear as the description proceeds.

Referring to the drawings—

Figure 5 is a sectional view taken along the planes indicated by the arrows 5—5 of Figures 1 and 2;

Figure 6 is a sectional view taken along the plane indicated by the arrows 6—6 of Figure 4;

Figure 7 is a sectional view taken along the planes indicated by the arrows 7—7 of Figure 6.

Figure 4:
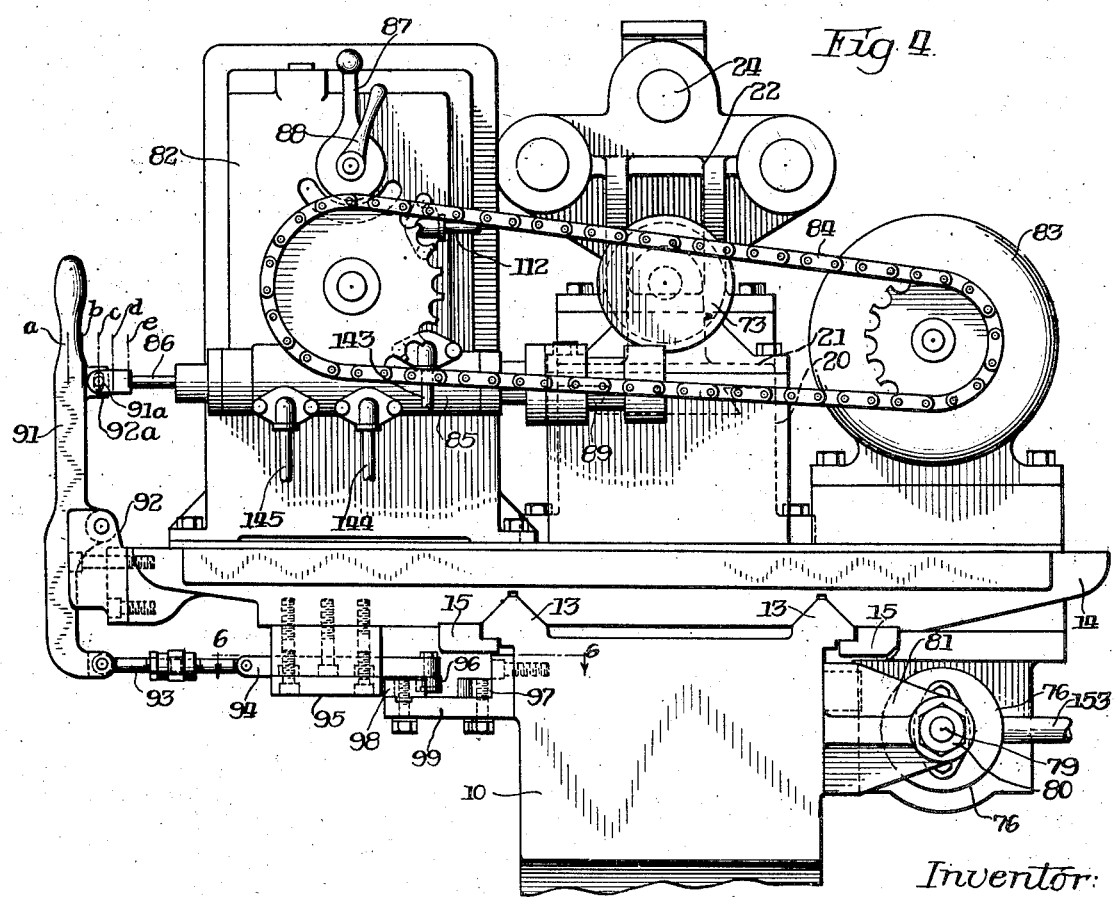
Figure 4 is a view in end elevation of the structure shown in the preceding figures, Figure 4 being taken as the parts are viewed looking at the tail end of the lathe.

The numeral 10 indicates the bed of a lathe supported by the legs 11—11. The numeral 12 indicates a pan underlying the bed 10 for receiving metal turnings and constituting a sump for cooling medium, which according to usual practice may be pumped into engagement with the cutting tool or tools of the lathe. By reference to Figures 4 and 5 it will be noted that the bed 10 includes the ways 13—13. Said ways 13—13 constitute supporting means for the platen 14, which, as shown in Figures 4 and 5, may be held against vertical movement relative to the bed 10 by means of the shouldered plates 15—15 secured by bolts, or otherwise, to the under side of the platen 14.

As will be described presently, said platen 14 has slidably mounted thereon a plurality of tool carrying slides. At the head end of the lathe and supported by the bed 10 is the headstock 16, which headstock may be of usual construction and may contain power transmitting means adapted to communicate power at selectable speeds to the chuck 17. Power for communicating motion to the parts within the headstock 16 may be derived from the electric motor 18, which, by means of a sprocket chain 19 or other preferred driving means, may be connected up to the mechanism within said headstock 16.

The illustrated embodiment of the present invention has the advantage that the use of flexible pipes may be dispensed with. The platen 14 carries a plurality of tool supporting sliding members, together with the fluid pressure operating means for said tool supporting sliding members. Said platen also carries the pump, or other source of fluid pressure, together with the electric motor for driving said pump.

Figure 3:
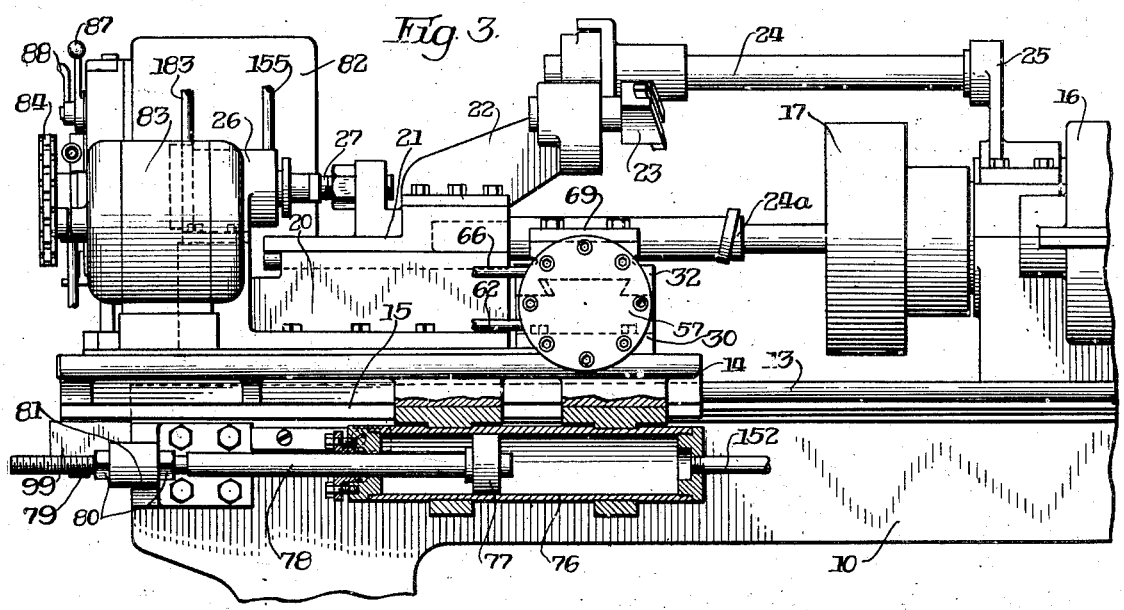
Figure 3 is a view in side elevation of part of the structure shown in Figure 2, said view being taken in the direction of the arrow 3 in Figure 2.

Referring particularly to Figure 3, it will be noted that the platen 14 is provided with the block 20 securely bolted to said platen, which block provides a support for slidably carrying the longitudinal tool slide 21. Said longitudinal tool slide 21 is provided with the bracket 22 adapted to carry a tool holder 23 and a pilot bar 24. Said pilot bar 24 is adapted to engage within an aperture in the bracket 25 secured to the headstock 16. Said longitudinal slide 21 is also provided with the tool 24a coaxially disposed relative to the chuck 17. The longitudinal tool slide 21 is adapted to be operated by the fluid pressure responsive cylinder 26, which controls the piston rod 27, adjustably connected to the longitudinal tool slide 21. Said operating cylinder 26 is secured, by bolts or otherwise, to the platen 14 and therefore moves as a unit with the platen 14.

Mounted to move transversely of the lathe are a pair of cylinders 28 and 29, which cylinders are adapted to move relative to pistons stationarily mounted relative to the platen 14. A preferred construction of the cylinders 28 and 29 and their associated parts will be clear from an inspection of Figure 5. It will be noted that the platen 14 carries a pair of blocks 30 and 31, which blocks are bolted, or otherwise secured, to said platen 14. Said blocks 30 and 31 provide supports for slidably carrying the cross slides 32 and 33, respectively. Said cross slides 32 and 33 are provided with tool holders 34 and 35, respectively.

The numerals 36 and 37 indicate piston rods rigidly and adjustably secured to the blocks 30 and 31, respectively. The means for mounting said piston rods 36 and 37 may be briefly described as follows. It will be noted that each of said piston rods is provided with a reduced extremity 38 surrounded by an externally screw-threaded bushing 39. Said bushings 39—39 are threaded into corresponding screw-threaded apertures 40—40 in said blocks 30 and 31. Nuts 41—41 lock said bushings firmly in position. The outer extremities of the bushings 39—39 are adapted to abut shoulders 42—42 on the piston rods 36 and 37, thereby taking the inward end thrust of said piston rods 36 and 37. The inner extremities of the reduced portions 38—38 of said piston rods 36 and 37 are threaded for the reception of nuts 43—43 and lock washers 44—44.

Each of the piston rods 36 and 37 is provided with a piston secured thereto. The piston secured to the piston rod 36 bears the numeral 45 and the piston secured to the piston rod 37 bears the numeral 46. Said pistons 45 and 46 have relatively large portions 47 and 48, respectively, which portions have sliding fits within the cylinders 28 and 29, respectively. Said pistons 45 and 46 also have the reduced portions 49 and 50, respectively. Said reduced portions 49 and 50 have sliding fits within portions 51 and 52, respectively, of the cylinders 28 and 29. By reason of the structure referred to, annular spaces 53 and 54 are provided between the inner end walls of cylinders 28 and 29 and the enlarged portions of the pistons 45 and 46. A fluid-tight fit between the reduced portions 49 and 50 of the pistons 45 and 46 and the cooperating portions of the cylinders 28 and 29 may be insured by means of the packing glands 55 and 56. The outer ends of the cylinders 28 and 29 may be tightly closed by means of the cylinder heads 57 and 58, respectively, which cylinder heads 57 and 58 may be cored out to provide spaces 59 and 60, respectively. The piston rod 36 is provided with a longitudinal port 61 communicating with the space 59. The other extremity of said port 61 communicates with a pipe line 62, which will be referred to more in detail presently. The piston rod 37 is provided with the longitudinal port 63, one end of which port communicates with the space 60 and the other end of which communicates with the pipe line 64, which will be referred to more in detail presently. The piston 36 is also provided with the port 65 communicating with the space 53. Said port 65 also communicates with the pipe line 66, to be referred to more in detail presently. The piston rod 37 is provided with the port 67 communicating with the space 54 and also communicating with the pipe line 68, to be referred to more in detail presently.

The cylinders 28 and 29 are shown in their innermost positions. It will be clear that when pressure is communicated through the pipe line 62 or 64, pressure will be exerted upon the cylinder heads 57 or 58, respectively, urging the corresponding cylinders outwardly. Conversely, when pressure is relieved from the pipe line 62 or 64 as the case may be and pressure is applied to the pipe lines 66 or 68, respectively, pressure will be communicated to said cylinders to move same inwardly. Said cylinders 28 and 29 are connected to the tool slides 32 and 33 by means of the brackets 69 and 70, respectively.

Figure 8:
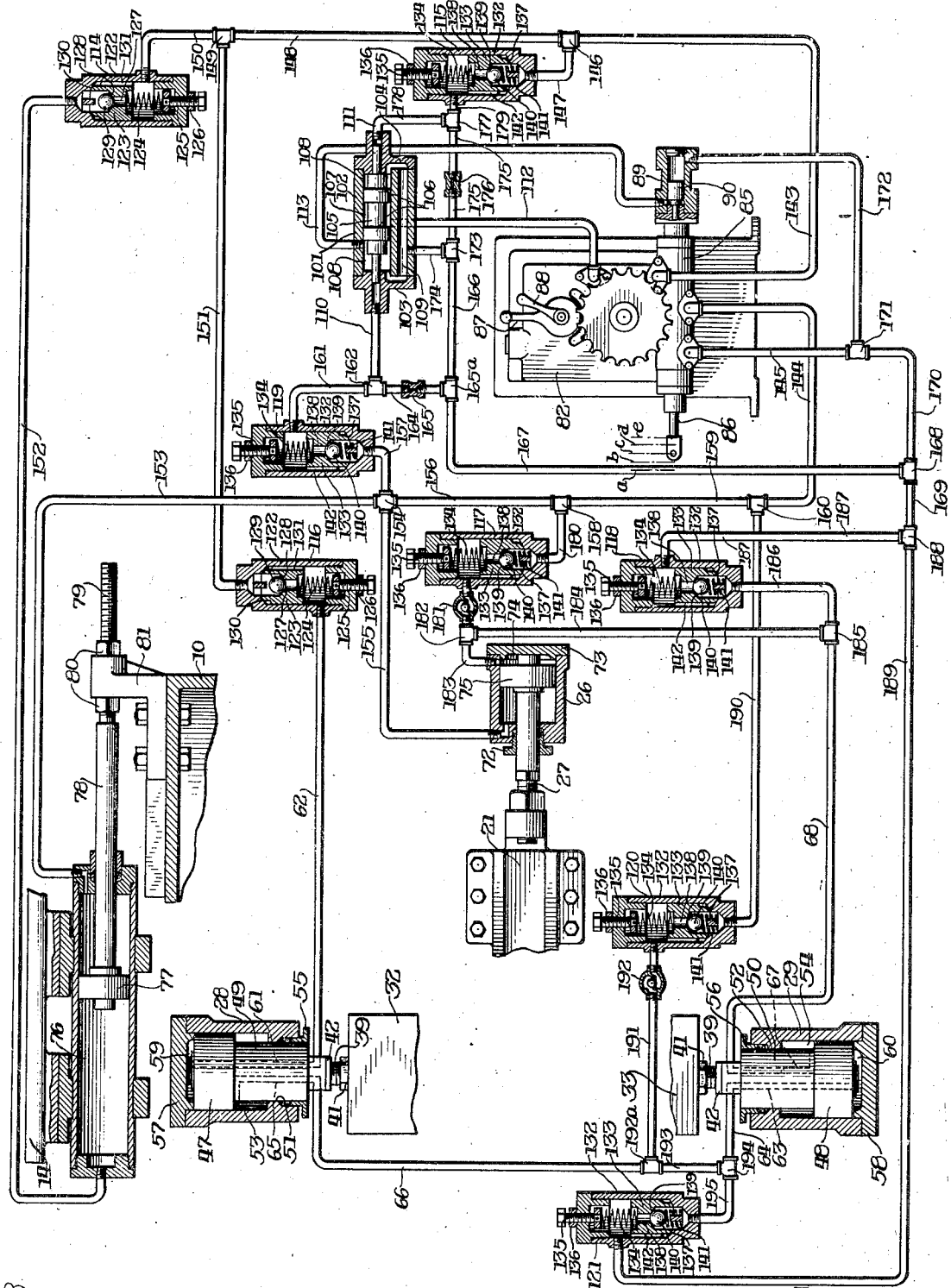
Figure 8 is a diagrammatic view showing the layout of the fluid pressure circuits involved in the structure shown in the preceding figures.

For a disclosure of the parts associated with the cylinder 26, which controls the longitudinal tool slide 21, reference may be had to Figures 3 and 8. From an inspection of Figure 8 it will be noted that the cylinder 26 has one end apertured to permit the passage of the piston rod 27, leakage being minimized by means of the packing gland 72. The other end of the cylinder 26 is closed by means of the cylinder head 73. The space at the right end of cylinder 26 is indicated by the numeral 74. Adapted to slide within the cylinder 26 is the piston 75, which is adapted to be moved forwardly and rearwardly by means of fluid pressure communicated alternatively to the two sides of said piston 75 through pipe lines which will be described presently.

The platen 14 is adapted to be operated in response to pressure within the cylinder 76, which cylinder 76 is rigid with the platen 14, being bolted or otherwise secured to said platen 14 on the under side thereof, as shown in Figure 5. By reference to Figure 8, the structure of the platen operating cylinder 76 and its associated parts will be clear. Slidably disposed within said cylinder 76 is the piston 77, which has connected thereto the piston rod 78. Said piston rod 78 has its outer extremity screw-threaded, as indicated by the numeral 79. Said screw-threaded portion 79 is adapted, through the medium of the adjusting nuts 80—80, to be adjustably secured to the bracket 81, bolted or otherwise secured to the bed 10 of the lathe. Pressure may be communicated alternatively to the two ends of the cylinder 76, which pressure, coacting with the piston 77, will move the cylinder, and with it the platen 14, forwardly or rearwardly, depending upon the disposition of said pressure on one or the other side of the piston 77.

The numeral 82 indicates a fluid pressure pump (Figs. 2, 3, 4 and 8). Said pump is carried by the platen 14 and is adapted to be driven by the electric motor 83 also carried by the platen 14. A sprocket chain 84 communicates driving power from the motor 83 to the pump 82. Said pump 82 is provided with the control valve 85 having a plunger 86 (Figs. 4 and 8). The position of said plunger 86 controls the direction of flow of the fluid pumped by said pump 82 and also controls the rate of flow per unit of time. As will be described presently, the plunger 86 of valve 85 may be positioned selectably to cause the pump 82 to pump fluid at a relatively high rate per unit of time to cause rapid traverse movement of the platen 14, or the tool carrying slides 21, 32 or 33. Said plunger 86 of the valve 85 may also be selectably positioned to deliver fluid in an amount per unit of time requisite for the feeding or cutting actions of the tools carried by the tool carrying slides 21, 32 or 33. Said positions (indicated in Figs. 4 and 8) are as follows:

*a*—position for rapid traverse forward movement of the platen 14 or slides 21, 32 and 33;

*b*—position for feeding or cutting movement of platen 14 or slides 21, 32 and 33;

*c*—neutral position for zero movement of the platen 14 or slides 21, 32 and 33;

*d*—position for feeding or cutting retreating movement of platen 14 or slides 21, 32 and 33, which position is not utilized in the illustrated embodiment of the present invention; and

*e*—position for rapid traverse retreating movement of the platen 14 or slides 21, 32 and 33.

The particular pump chosen for illustration includes a control lever 87 for modifying the rate of flow of fluid from the pump 82 to vary the feeding speeds of the tools carried by slides 21, 32 and 33. A locking lever 88 is provided for locking the control lever 87 in any preferred position.

Figure 2:
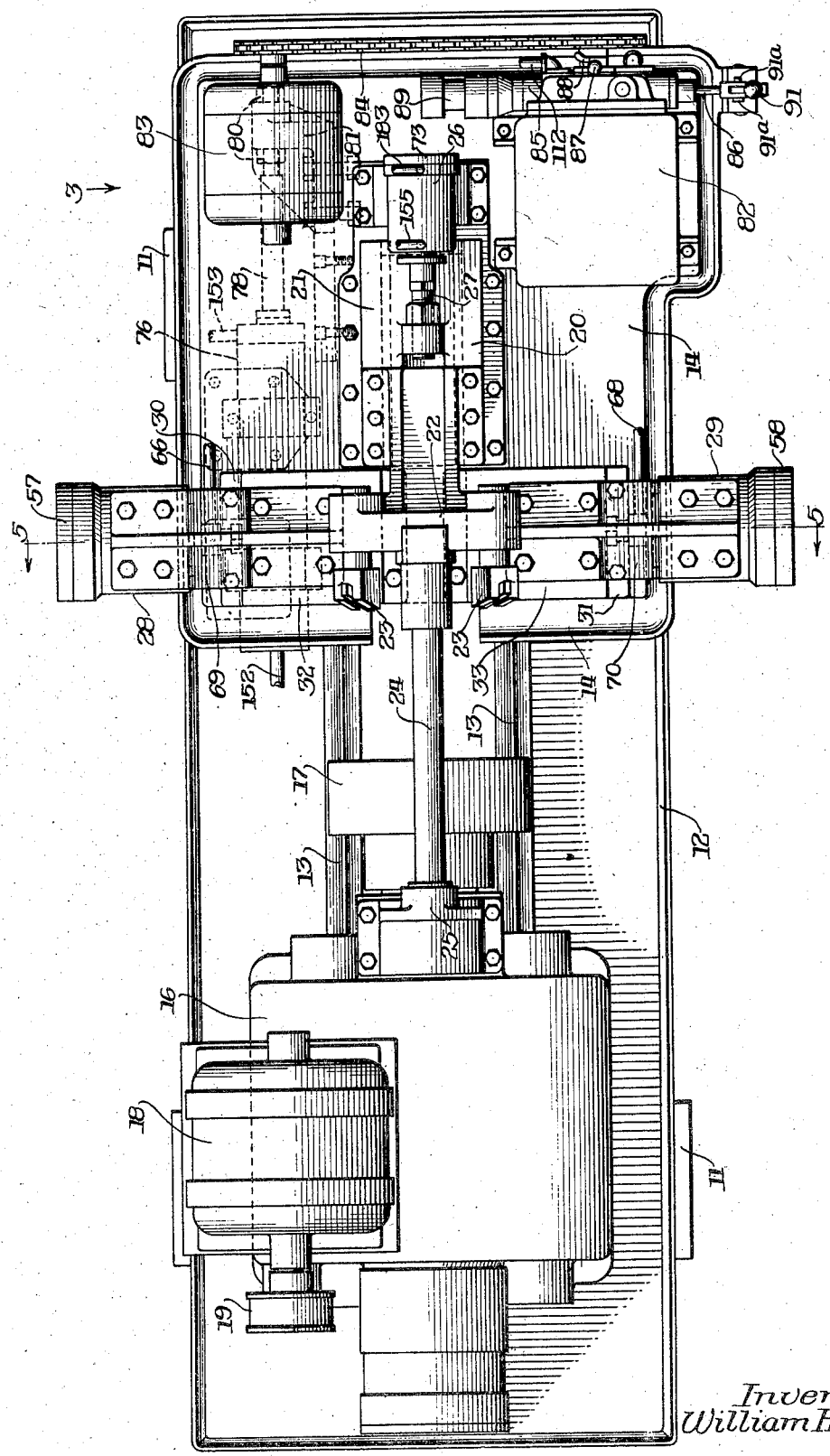
Figure 2 is a top plan view of the structure shown in Figure 1.

The numeral 89 indicates a governing cylinder having a piston 90 therein (Fig. 8). Pipe lines communicate with said cylinder 89 on the two sides of the piston 90, whereby said piston may be moved by means of fluid pressure delivered by the pump 82. Said piston 90 is secured to an extremity of the plunger 86. Pressure is applied to the piston 90 in the governing cylinder 89 only momentarily, and at other times said plunger 86 may be manually operated. Moreover, said plunger 86 may be operated by certain cams, to be referred to presently, operative in response to movement of the platen 14. For manually operating the plunger 86 of the control valve 85, the handle 91 is provided (Figs. 2 and 4). As will be seen from Figure 4, said handle 91 is pivotally connected to the plunger 86. The pivotal connection between the handle 91 and the plunger 86 should be a loose one, whereby to avoid binding. For the purpose of providing the loose connection referred to, the handle 91 is provided with transversely extending studs 91a adapted to ride in elongated slots 92a in the bifurcated end portion of the plunger 86. Said handle 91 is pivoted intermediate of its length to a bracket 92 bolted or otherwise secured to the platen 14. The lower extremity of the handle 91 is pivotally connected to one end of the extensible strut 93, the other end of which is pivotally connected to the roller holding member or slide 94. Said roller holding member or slide 94, as shown in Figures 4, 6 and 7, is slidably mounted in a bracket 95 bolted or otherwise secured to the under side of the platen 14. Said bracket 95 guides the roller holding member or slide 94 in a right line movement transversely of the lathe. The inner extremity of the member 94 is provided with the roller 96 adapted to be engaged selectably by the cam 97 or the cam 98. Said cams 97 and 98 are adjustably carried by the angle member 99 (Figs. 4, 6 and 7), which angle member is bolted or otherwise secured to the bed 10 of the lathe. One leg of said angle member 99 is horizontally disposed and is provided with elongated slots 100—100, whereby the cams 97 and 98 may be adjusted longitudinally relative to said angle member 99.

The pipe lines, valves and other members for controlling the flow of fluid from the pump 82 to the instrumentalities above mentioned will now be described.

Referring to Figure 8, the numeral 101 indicates a pilot valve comprising the cylinder wall 102 and the two cylinder heads 103 and 104. Said cylinder heads in themselves comprise cylinders for receiving the two extremities of the plunger 105 of said pilot valve 101. Said plunger 105 includes the two relatively large annular portions 106—106 providing between them the annular space 107. Said portions 106 also provide the spaces 108—108 at the two extremities of the cylinder wall 102. Communication is had between the two spaces 108—108 at the two extremities of the cylinder wall 102 through the aperture 109. Communicating with the cylinder head 103 is the pipe line 110, and communicating with the cylinder head 104 is the pipe line 111. As will be explained presently, pressure will be applied selectably through pipe connections 110 and 111 to move the plunger 105 to one extreme or the other of its travel. Communicating with the annular space 107 is the pipe line 112, which pipe line 112 leads from the pump 82 and always has a pressure therein so long as the pump 82 is being operated. It may be stated at this point that the pressure delivered through pipe line 112 may be relatively low. The space 108 adjacent to the cylinder head 103 is adapted to communicate with the pipe line 113 when the plunger 105 is at the right-hand part of its travel as the parts are viewed in Figure 8. When said plunger 105 is in the left-hand part of its travel, communication between the space 108 adjacent to the cylinder head 103 and pipe line 113 will be interrupted by the left hand relatively large annular portion 106 of said plunger 105. Said pipe line 113 leads to the space to the left of the piston 90 in the governing cylinder 89.

The numerals 114, 115, 116, 117, 118, 119, 120 and 121 indicate resistance valves. Of said valves, those bearing the numerals 114 and 116 are shown as similar in structure, though they may differ in calibration. Valves 115, 117, 118, 119, 120 and 121 may be similar in construction to valves 114 and 116 (though differing in calibration therefrom) but have been illustrated as of slightly different form merely for the reason that in an actual embodiment of the present invention the corresponding valves were different from the valves corresponding to valves 114 and 116 herein. The differences noted were provided in the actual embodiment mentioned for the reason that due to their position on the lathe, it was convenient in some instances to have the adjusting screws thereof at the tops of said valves and in other instances it was convenient to have said adjusting screws at the bottoms of said valves. A description of resistance valve 114 will suffice for a description of resistance valve 116 as well.

Each of said resistance valves 114 and 116 includes a cylinder 122 having a plunger 123 therein spring-pressed upwardly by means of the spring 124, the tension of which spring may be adjusted by means of the screw 125. Said screw 125 may be locked in adjusted position by means of the lock nut 126. The plunger 123 is provided with the longitudinally extending aperture 127 providing the valve seat 128, which valve seat 128 carries the valve member 129. The plunger 123 has a bearing surface 130, preferably conical in contour, bearing against the upper head of the cylinder 122. The spring 124 normally holds the plunger 123 in liquid-tight engagement with the upper head of the cylinder 122, but when sufficient pressure is exerted upon the upper side of the plunger 123, said plunger 123 will be forced downwardly. The plunger 123 is provided with the longitudinally extending groove 131 on its periphery, which provides communication from the bottom side of the plunger 123 to the top side thereof independently of the longitudinal aperture 127. It will be clear that the fluid directed under pressure into the space below the plunger 123 will flow past the valve 129 without interference. When the direction of fluid pressure is reversed, however, and said pressure is applied to the top side of the plunger 123, the passage of fluid through the aperture 127 will be prevented by the valve member 129. No fluid will pass until sufficient pressure has been applied to the top side of the plunger 123 to move said plunger from its seat against the action of the spring 124. When sufficient pressure is applied to move said plunger 123 from its seat, fluid may flow past the surface 130 of said plunger 123 through the groove 131 to the space below the plunger 123.

Resistance valves 115, 117, 118, 119, 120 and 121 are similar to one another in structure, but may be differently calibrated. A description of one of said valves will suffice for all. Each of said valves comprises a cylinder 132 having slidably disposed therein a plunger 133, which plunger is urged to one extremity of the cylinder 132 by the spring 134. The tension of said spring 134 may be adjusted by means of the screw 135, which may be locked in adjusted position by means of the lock nut 136. The plunger 133 in the illustrated embodiment of the present invention is urged downwardly by the spring 134 and is provided with a conical bearing surface 137 adapted to engage a similar surface in the head of cylinder 132. Disposed longitudinally of the plunger 133 is the aperture 138, which provides a seat 139 for a valve member 140. Said valve member 140 is held upwardly against said seat 139 by means of the spring 141. The plunger 133 is provided with a longitudinal groove 142 on the periphery of said plunger. Said groove 142 extends from one side of the plunger 133 to the other side thereof. It will be clear that if fluid is delivered to the space above the plunger 133 under sufficient pressure to move the valve member 140 from its seat, said fluid may pass through the aperture 138. On the other hand, when fluid under pressure is communicated to the lower side of the plunger 133, said valve 140 will prevent the passage of said fluid through the aperture 138. When pressure within said fluid applied to the lower side of the plunger 133 is at or above a predetermined value, the plunger 133 will be moved upwardly against the tension of the spring 134, moving the surface 137 out of engaging relationship with the lower head of the cylinder 133, permitting the flow of fluid past said surface 137 through the groove 142 to the space on the upper side of the plunger 133.

It will be noted that in the valves 114 and 116 gravity holds them valve member 129 upon its seat, and in the valves 115, 117, 118, 119, 120 and 121 the spring 141 holds the valve member 140 upon its seat. Said spring 141 should be a relatively weak spring offering no substantial resistance to the flow of fluid downwardly through the aperture 138.

The control valve 85 is provided with three pipe lines 143, 144 and 145. Pipe line 143 leads to the coupling 146, from which the pipe line 147 leads to the resistance valve 115 having communication to the space below the plunger 133 thereof. Also leading from the coupling 146 is the pipe line 148, which leads to the coupling 149. Leading from the coupling 149 is the pipe line 150, which communicates with the space below the plunger 123 of the resistance valve 114. Also leading from the coupling 149 is the pipe line 151, which leads to the space on the upper side of the plunger 123 of the resistance valve 116. The space below the plunger 123 of resistance valve 116 connects with pipe line 62. The space above the plunger 123 of resistance valve 114 leads through the pipe line 152 to the space at the left side of the piston 77 in the platen operating cylinder 76. The space at the right side of said piston 77 communicates through the pipe line 153 to the coupling 154. Leading from said coupling 154 are the pipe lines 155, 156 and 157.

Pipe line 156 leads to the coupling 158, from which pipe line 159 leads to the coupling 160. From the coupling 160, pipe line 144 leads back to the control cylinder 85.

Pipe line 157 connects the coupling 154 with the space on the under side of the plunger 133 of the resistance valve 119. The space above said plunger 133 of resistance valve 119 communicates with the pipe line 161, which pipe line leads to the coupling 162. Said coupling 162 is connected, through pipe line 110, with the cylinder head 103 of the pilot valve 101. This connection provides communication with the plunger 105 of said pilot valve 101. From the coupling 162 leads the pipe line 164, which pipe line includes the restricted orifice member 165. Said pipe line 164 is connected to the coupling 165a. Said coupling 165a has connected thereto the pipe line 166 and the pipe line 167. Pipe line 167 leads to the coupling 168. To coupling 168 are connected the pipe lines 169 and 170. Pipe line 170 leads to the coupling 171. Coupling 171 is connected to the pipe line 145 leading to the control cylinder 85. Said coupling 171 is also connected, through the pipe line 172, to the space at the right of the piston 90 within the governing cylinder 89.

Pipe line 166 is connected to the coupling 173, to which are connected the pipe line 174 and the pipe line 175. Said pipe line 174 is connected to the longitudinal aperture 109 of the pilot valve 101. It will be noted that with the parts as indicated in Figure 8, pipe line 174 has access through the space 108 adjacent to the cylinder head 103 of pilot valve 101 to the pipe line 113 leading to the space at the left of the piston 90 of the governing cylinder 89.

The pipe line 175 is provided with the restricted orifice member 176. Said pipe line 175 connects with the coupling 177, from which lead the pipe line 178 and pipe line 179. Said pipe line 178 leads to the cylinder head 104 of the pilot valve 101, and provides communication to the right-hand extremity of the plunger 105. Pipe line 179 leads to the space above the plunger 133 of the resistance valve 115. As noted above, the space below said plunger 133 of valve 115 communicates through pipe line 147 and coupling 146 to the pipe line 143.

The coupling 158, which connects pipe line 156 to pipe line 159 also connects with the pipe line 180, which leads to the space below the plunger in the resistance valve 117. The space above the plunger in said resistance valve 117 is connected through the check valve 181 to the coupling 182. Said check valve 181, it will be noted, will permit flow of fluid from the resistance valve 117 through said check valve, but will stop the flow of fluid in the opposite direction. Said coupling 182 has connected thereto the pipe line 183 leading to the space at the right of the piston 75 in the longitudinal slide operating cylinder 26. Said coupling 182 also has connected thereto the pipe line 184, which leads to the coupling 185. Said coupling 185 is connected, through the pipe connection 186, to the space below the plunger of the resistance valve 118. The space above the plunger in resistance valve 118 is connected, through the pipe line 187, to the coupling 188. Said coupling 188 has connected thereto the pipe line 169, above referred to, and the pipe line 189. Said coupling 185 connects with the pipe line 68.

The coupling 160 is connected, through the pipe line 190, to the space below the plunger of the resistance valve 120. The space above said plunger in said resistance valve 120 connects with the pipe line 191, which pipe line includes the check valve 192. Said check valve 192 is so designed that it will permit flow of fluid from said valve 120, but will stop flow of fluid in the opposite direction. Said pipe line 191 is connected to the coupling 192a. Said coupling 192a is connected to the pipe line 66 above mentioned, and is also connected to the pipe line 193. Said pipe line 193 is connected to the coupling 194. Said coupling 194 has connected thereto the pipe line 64 above mentioned and the pipe line 195. Said pipe line 195 leads to the space below the plunger in the resistance valve 121. The space above said plunger in said resistance valve 121 is connected to the pipe line 189 above mentioned.

A mode of operation of the present invention will now be described, the circuits for conducting the oil or other fluid under pressure being traced as briefly as possible. The source of fluid pressure is the pump 82, which has cooperatively associated therewith the control valve 85 and the four pipe lines 112, 143, 144 and 145. Assuming that the platen 14, the longitudinal slide 21 and the cross slides 32 and 33 are all in retracted positions, and assuming that the operative desires to start a cycle, he will, by means of the handle 91 (Fig. 4), move the plunger of the control valve 85 to position $a$ (Figs. 4 and 8), which is the rapid traverse forward position. In using the term "retracted position" with reference to the platen 14 and the longitudinal slide 21, it is meant that said members are at the right-hand extremities of their ranges of movement as the parts are viewed in Figures 1, 2 and 8. With reference to the cross slides 32 and 33, it is meant that said cross slides are at the limits of their movement toward the longitudinal center line of the lathe. Under these conditions, fluid under pressure will be delivered through pipe lines 143, 148 and 150 through resistance valve 114 (flow of fluid in this direction being without resistance) through pipe line 152 into the space to the left of the piston 77 within the platen operating cylinder 76. As has been noted hereinbefore, said cylinder is rigidly secured to the platen 14, and the piston 77 thereof is rigidly though adjustably secured to the bed 10 of the lathe.

Figure 1:
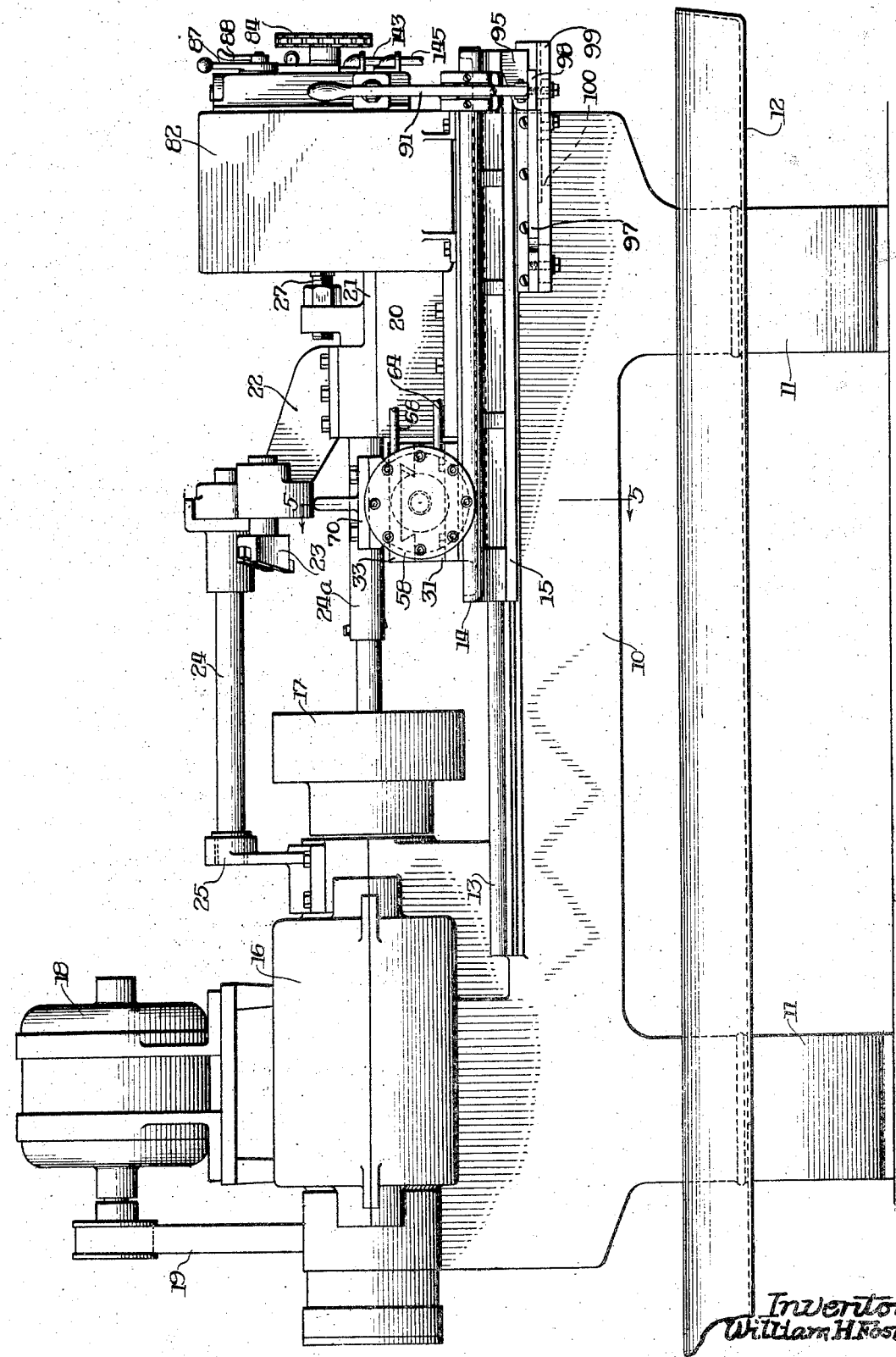
Figure 1 is a view in side elevation of a lathe embodying the principles of the present invention.

Fluid is prevented from passing through pipe lines 147 and 151 at this time by the resistance valves 115 and 116, respectively, until the cylinder 76 has reached its limit of travel in a left-hand or forward direction as the parts are viewed in Figures 1, 2 and 8. Usually this limit of travel will be determined by adjustment of the nuts 80—80 on the threaded extremity of the piston rod 78, whereby the piston 77 will abut against the right-hand cylinder head of cylinder 76 at the desired limit of forward movement of the platen 14.

It is within the scope of the present invention to provide mechanism whereby the lathe may be controlled so that the platen 14 may move not only with a rapid traverse movement for carrying the tool carrying slides 21, 32 and 33 forwardly to operative positions, but, if desired, the platen may be moved at a feeding speed during the finishing operation of its forward movement. The choice of whether or not the platen 14 will be slowed down to a feeding speed during the finishing part of its movement may be made by adjusting the cam 97 (Figs. 6 and 7). Said cam 97 may be so positioned that before the platen 14 reaches the end of its stroke in a forward direction, said cam 97 will engage the roller 96, resulting in the movement of the slide 94 and handle 91 to position $b$ (Figs. 4 and 8), which is the position for forward feeding movement. That is to say, position $b$ is the position wherein the valve 85 will control the output of the pump 82 to cause the delivery of a restricted quantity of fluid per unit of time. The roller 96 will continue along the high part of the cam 97 until the platen 14 has reached the limit of its travel. If no feeding speed is desired in the movement of the platen 14, said cam 97 will be so positioned that it will operate the roller 96 to move the plunger 86 to position $b$, just as the end of the stroke of the cylinder 76 is reached. During the forward movement of the platen immediately above described, fluid will be returned from the right-hand end of cylinder 76 through the pipe lines 153, 156, 159 and 144 to the pump 82.

Pressure will now build up in pipe lines 143, 148 and 151. The resistance of resistance valve 116 will be chosen of a lower value than the resistance of the resistance valve 115. Fluid will therefore pass through resistance valve 116, pipe line 62 and passageway 61 to the space 59 at the end of the cross slide operating cylinder 28, causing said cylinder to move outwardly, carrying with it its corresponding tool slide 32.

While said cylinder 28 is moving outwardly carrying with it its corresponding tool slide 32, fluid will be forced out of the space 53 in the cylinder 28, through the port 65, pipe lines 66, 193 and 64, to the port 63 within the piston of the cross slide operating cylinder 29. Said fluid will move cylinder 29 in an outward direction, carrying with it the corresponding tool slide 33. At the same time, fluid will be forced out of the space 54 within the cylinder 29 through the port 67 and pipe lines 68, 184 and 183 into the space 74 at the right-hand end of the longitudinal slide operating cylinder 26, causing forward movement of the longitudinal slide 21. At this time fluid on the left-hand side of the piston 75 within the cylinder 26 is returned through pipe lines 155, 156, 159 and 144 to the pump 82.

After the cylinders 28 and 29 and the piston 75 have completed their strokes, pressure will build up sufficiently in pipe line 143 to pass fluid through the resistance valve 115, whence fluid will pass through pipe lines 179 and 178, and will shift the plunger 105 within the pilot valve 101 toward the left as the parts are viewed in Figure 8, causing communication from pipe line 112 through pipe line 113 to the left end of the governing cylinder 89, causing the plunger within the control valve 85 to move to the right as the parts are viewed in Figure 8, moving said plunger to position e, which is the position for controlling the pump 82 to cause rapid traverse retreating movement of the platen 14 and slides 21, 32 and 33 to starting position.

At this point the relative volumes of the cylinders above mentioned may be discussed.

As noted above, after the platen 14 has completed its stroke in a forward direction through the operation of the cylinder 76, pressure builds up sufficiently within the pipe line 151 to force fluid through the resistance valve 116 to the space 59 within the cylinder 28. The maximum volume or capacity of the space 53 within the cylinder 28 will be chosen slightly greater than the volume of the space 60 within the cylinder 29. Moreover, the volume of said space 54 will be chosen slightly greater than the volume of the space 74 within the cylinder 26. Thus it will be seen that if no leakage occurs past the pistons within the three cylinders last mentioned, the piston within cylinder 26 will reach the end of its stroke first. When said piston 75 has reached the end of its stroke, the cylinder 29 will not have reached quite the end of its stroke. Therefore, a small quantity of fluid will be forced through port 67, pipe line 68, pipe line 186, resistance valve 118 and pipe lines 187, 169, 170 and 145 to the pump 82. In like manner, when the cylinder 29 has reached the end of its stroke, cylinder 28 will not have reached the end of its stroke, and a small quantity of fluid remaining in the space 53 of cylinder 28 will be forced out through the port 65, pipe lines 66, 193 and 195, resistance valve 121, pipe lines 189, 169, 170 and 145 back to the pump 82. When the cylinder 28 has reached the end of its stroke, pressure will build up in pipe lines 143 and 147, opening resistance valve 115, shifting the plunger 105 of the pilot valve 101 to the left as the parts are viewed in Figure 8. Fluid pressure within the pipe line 112 now communicates through the annular space 107 within the pilot valve 101 through the pipe line 113 to the space at the left of the piston 90 within the governing cylinder 89, resulting in the movement of the plunger 86 of control valve 85 to position e, which is the position for rapid traverse retreating movement.

With the plunger of the valve 85 in position e, fluid will now be delivered through the pipe line 144, pipe lines 159, 156 and 155 to the space at the left of the piston 75 within the longitudinal slide operating cylinder 26, causing the retreating movement of said piston 75 and its corresponding longitudinal tool slide 21. Fluid will be forced out of the space 74 at the right-hand end of the cylinder 26 to pipe lines 183, 184 and 68, port 67 of cylinder 29 to the space 54 within said cylinder 29, resulting in the retreating movement or inward movement of said cylinder 29 and its corresponding cross slide 33. Fluid will be forced out of the space 60 through the port 63 to pipe lines 64, 193 and 66 and port 65 to the space 53 within the cylinder 28, resulting in the retreating or inward movement of said cylinder 28, which cylinder moves the corresponding cross slide 32 in its retreating movement toward the longitudinal center line of the lathe.

The fluid in the space 59 of the cylinder 28 passes through port 61 to pipe line 62, through the resistance valve 116, which presents no resistance to flow in this direction, through pipe lines 151, 148 and 143 to the pump 82. As indicated above, the maximum volume of the space 74 within the longitudinal slide operating cylinder 26 is somewhat less than the maximum volume of the space 54 within the cross slide operating cylinder 29. Consequently, the fluid from the space 74 cannot completely accomplish a retreating stroke of the cylinder 29. Therefore, an auxiliary fluid supply is provided for completing the retreating movement of said cylinder 29. Such auxiliary supply is provided through the pipe line 180, resistance valve 117, check valve 181, pipe lines 184 and 68. Likewise, inasmuch as the volume of the space 60 within the cylinder 29 is less than the maximum volume of the space 53, the fluid from the space 60 cannot cause the complete retreating movement of the cylinder 28. An auxiliary fluid supply to complete the retreating movement of the cylinder 28 is provided through the pipe line 190, resistance valve 120, check valve 192, pipe lines 191 and 66 to the port 65. During the retreating movements of cylinders 28 and 29 and the piston 75, fluid was prevented from passing through pipe line 153 to the platen operating cylinder 76 by the resistance valve 114. It will be noted that the fluid in the left end of the cylinder 76 must be returned through pipe line 152 and resistance valve 114, the resistance of valve 114 being sufficient to prevent movement of the cylinder 76 until the cylinders 28 and 29 and the piston 75 within the cylinder 26 are fully retreated.

After said cylinders 28 and 29 and said piston 75 are fully retreated, the pressure will build up in pipe line 153, causing movement of the cylinder 76 in a retreating direction, carrying with it the platen 14. At a predetermined position, the cam 98 (see Figs. 4, 6 and 7) will engage the roller 96 disposed in cooperative relationship with the slide 94, strut 96, handle 91 and plunger 86. The cam 98 will produce the gradual shifting of the plunger 86 until position c is reached, which terminates the cycle of operation. During the retreating movement above described, there is pressure in the pipe line 156 sufficient to force fluid past the resistance valve 119 through pipe lines 161 and 110. Thus fluid under pressure will be applied to the left-hand end of the plunger 105 of the pilot valve 101, shifting said plunger 105 to the right, cutting off communication from pipe line 112 through pipe line 113 to the control cylinder 89. As noted above, the pressure within pipe line 112 is always in the same direction and is always existent while the electric motor 83 is driving the pump 82.

The restricted orifice members 176 and 165 are provided to permit any slight leakage which might occur through resistance valves 115 and 119 to enter the drain line 167 through pipe lines 170 and 145 back to the pump 82, thereby avoiding a premature shifting of the pilot valve 101. However, the openings through said restricted orifice members are sufficiently small so that when resistance valves 115 and 119, respectively, are forced open and fluid flows through said valves, the volume of loss through said restricted orifice members 176 and 165 is not sufficiently great to interfere with the shifting of the plunger 105 of the pilot valve 101.

It will be understood, of course, that in setting up the lathe for operation, the resistance valves will all be adjusted whereby said resistance valves will open in the preferred sequence. It will also be understood that if it should be preferred to move the cross slides 32 and 33 inwardly during the cutting stroke, the structure may be readily altered to anchor the cylinders to the bases and to connect the pistons to said cross slides.

With particular reference to the resistance functions of the resistance valves 117 and 120, it may be stated that resistance valve 117 will be so calibrated that its resistance is somewhat greater than the pressure required in pipe lines 156 and 155 to return the piston 75 in the longitudinal slide operating cylinder 26 to its retreated position. After said piston 75 has reached the limit of its retreating movement, that is—in its extreme right-hand position as the parts are viewed in Figure 8, pressure will build up in pipe line 144 sufficient to pass fluid through the pipe lines 159 and 180, resistance valve 117 and check valve 181. Communication is now had through pipe line 183 to the space 74 at the right of the piston 75 and also to the pipe line 184. The pressure building up in pipe line 144 also communicates through pipe lines 156 and 155 to the space at the left of the piston 75. Inasmuch as the pressure applied through pipe line 180, resistance valve 117 and check valve 181 will be reduced by the action of the resistance valve 117, it will be clear that the pressure on the left-hand side of the piston 75 is considerably greater than that communicated to the right-hand side of said piston through the pipe line 183. Therefore, said piston 75 will remain in retreated position.

Moreover, the resistance of the valve 120 is somewhat greater than the pressure required to open the resistance valve 117. After the fluid has passed valve 117 and check valve 181, it will, by way of pipe lines 184 and 68, fill the space 54 within the cylinder 29. Pressure in pipe line 144 will build up higher, forcing fluid through valve 120, check valve 192, pipe line 191 and pipe line 66 into the space 53 within the cylinder 28. In the meantime, resistance valve 114 has offered sufficient resistance to the passage of fluid to cause back pressure in the left-hand end of cylinder 76 so that after fluid has passed valve 120 and filled the space 53 within the cylinder 28, pressure will again rise to sufficient value in pipe lines 144, 159, 156 and 153 and piston 77 and pipe line 152 to overcome the back pressure of the resistance valve 114. It is understood, of course, that during the retreating movement of the tool slide cylinders 28 and 29 and the piston 75, the fluid in the space 59 of cylinder 28 will return through port 61, pipe line 62, resistance valve 116 (the flow being free in this direction), through pipe lines 151, 148 and 143 to the pump 82.

After the tool slide cylinders 28 and 29 and the piston 75 have been returned to their extreme retreated positions and the cylinder 76 moves in a retreating direction, the fluid on the left side of the piston 77 within said cylinder 76 will be returned through the pipe line 152, resistance valve 114 (valve 114 offering resistance in this direction), thereby delaying the retreating operation of cylinder 76 until after the cross slides 32 and 33 and the longitudinal slide 21 are fully retreated. From the resistance valve 114, fluid passes through the pipe lines 150, 148 and 143 to the pump 82.

It will be noted that the power required to operate the cylinders 28 and 29 and the piston 75 is supplied by the pressure delivered to the space 59 within the cylinder 28. Part of this power is used up in operating the cylinder 28. In moving outwardly, the cylinder 28 expels fluid from the space 53 through the port 65, pipe line 66, pipe line 194 and port 63 to the space 60 within the other cross slide operating cylinder 29. Power is consumed in operating said cylinder 29, but operation of said cylinder 29 in an outward direction results in the expulsion of fluid from the space 54 within said cylinder 29 through pipe lines 68, 184 and 183 to operate the piston 75 within the longitudinal slide cylinder 26. Accordingly, the pressure in pipe line 184 is less than in pipe line 66, and the pressure in pipe line 66 is less than in pipe line 62. Therefore, the resistance valve 118, being calibrated to discharge the excess fluid from the space 54 within cylinder 29 after the space 74 within the cylinder 26 has been filled, need be set only to a resistance somewhat greater than is required to operate the piston 75 within the cylinder 26.

However, the resistance valve 121 should be calibrated to a value to respond to a pressure somewhat greater than the pressure required in pipe line 66 to operate the cylinder 29 and piston 75. It will be noted that during the retreating movements of the cylinder 29 and the piston 75, fluid is prevented, by the check valve 192, from passing out through the valve 120. At the same time fluid is prevented by the check valve 181 from passing out through the resistance valve 117. Said fluid is therefore operative to move said cylinder 29 and said piston 75.

Recapitulating certain salient features of the mode of operation of the described embodiment of the present invention, let it be assumed that the parts are all in their retreated positions. Under these conditions, the platen operating cylinder 76 may be in the position shown in Figure 8, wherein said cylinder 76 is only midway of its possible range of movement. The longitudinal slide operating piston 75 is at the right-hand end of its corresponding cylinder 26, and the cross slide operating cylinders 28 and 29 are at the innermost limits of their ranges of travel. If the operative desires to start operations, he will move the plunger 86 to position a, which, as explained above, will cause the delivery of fluid under pressure from the pump 82 through the pipe line 143, through the resistance valve 114, to the left end of the cylinder 76. At this time fluid from the right end of cylinder 76 may discharge through the pipe line 153 back to the pump 82. Under these conditions the cylinder 76 will move to the left. As explained above, position a of the plunger 86 is the position which causes the pump 82 to deliver a relatively large quantity of fluid per unit of time, whereby a rapid traverse movement is communicated to the cylinder 76, resulting in the rapid traverse forward movement of the platen 14. When said platen 14 has moved to a predetermined position, roller 96 (Figs. 4, 6 and 7), being carried forward with said platen 14, will be engaged by the cam 97 (Figs. 4, 6 and 7), moving said roller and its slide 94 outwardly, resulting in the moving of the handle 91 and the plunger 86 to position b (Figs. 4 and 8). Position b corresponds to a forward feeding movement, which means that the pump 82 is so controlled by the control valve 85 that a relatively small quantity of fluid per unit of time is delivered by said pump 82. Said cam 97, being adjustable, may be so set that the plunger 86 is moved to position b before the platen operating cylinder 76 has quite reached the end of its stroke; or, if preferred, said cam 97 may be so set that the plunger 86 is moved to position b at substantially the instant that the cylinder 76 reaches the end of its movement in a forward direction.

After the cylinder 76 has moved to the left as the parts are viewed in Figure 8, to the limit of its movement, fluid pressure delivered by the pump through the pipe line 143 will build up to a sufficient value to force open the resistance valve 116, resulting in the delivery of fluid to the space 59 within the operating cylinder 28. Said cylinder 28 and cross slide 32 will therefore move outwardly from the center line of the lathe in a feeding or cutting movement. While said cylinder 28 is moving outwardly, fluid is discharged from the space 53 within said cylinder 28 through the pipe line 66 to the space 60 within the operating cylinder 29, which operates the cross slide 33. Therefore, outward or cutting movement of the cross slide 32 will be accompanied by outward or cutting movement of the cross slide 33. As the operating cylinder 29 moves outwardly, fluid will be discharged from the space 54 within said operating cylinder 29 through the pipe line 68 to the space 74 at the right of the piston 75 within the longitudinal slide operating cylinder 26. This action will result in the movement of the piston 75 in a forward or feeding movement, causing a like movement in the longitudinal slide 21. Therefore, simultaneous feeding movements will be had in the two cross slides 32 and 33 and the longitudinal slide 21.

As indicated above, in order to compensate for leakage, it is necessary to provide a larger storage capacity in the space 53 than in the space 60. Likewise, it is necessary that the maximum capacity of space 54 be greater than the maximum capacity of the space 74. By reason of these relative proportions of the capacities of the spaces referred to, it is insured that said cylinders 28 and 29 and said piston 75 will move to their full limits of travel in their cutting or feeding movements. In practice it will be preferred to overcompensate rather than undercompensate for the leakage of fluid referred to, and therefore the longitudinal slide will reach its limit of movement first, after which the cross slide 33 will reach its limit of movement, after which the cross slide 32 will reach its limit of movement.

After the cross slide 32 has reached its limit of movement, which means that the cylinder 28 has reached its limit of movement, the pump can no longer deliver fluid through pipe lines 148, 151 and 62, and pressure in pipe line 143 will build up to a sufficient value to force open the resistance valve 115, passing fluid to the right-hand end of the pilot valve 101, moving the plunger 105 of said pilot valve toward the left as the parts are viewed in Figure 8. With the plunger 105 in its left-hand position, communication is had through the pipe line 112, which is always under relatively low pressure, to the pipe line 113. Fluid entering the pipe line 113 will be applied to the left-hand side of the piston 90 in the control cylinder 89, moving said piston and the plunger 86 to the right, that is—to position e, which is the rapid traverse retreating position of said plunger 86. Fluid leaking past the piston 90 will drain back through connections 172 and 145 to the sump. Expressed in other language, under these conditions the pump 82 will deliver a relatively large quantity of fluid per unit of time.

Under these conditions fluid will be delivered through the pipe line 144, through pipe line 155, to the left-hand end of the longitudinal slide operating cylinder 26, resulting in the movement of the piston 75 in a retreating movement at a rapid traverse rate, which is to say that the longitudinal slide 21 is caused to retreat in a rapid traverse movement. The movement of the piston 75 toward the right is accompanied by the discharge of fluid from the space 74 at the right of the piston 75, through pipe lines 184 and 68 to the space 54 within the operating cylinder 29, causing said cylinder to move toward the longitudinal center line of the lathe, which is to say that the cross slide 33 is moved toward the longitudinal center line of the lathe. This movement will be at a rapid traverse rate. Movement of the cylinder 29 toward the center line of the lathe will be accompanied by the discharge of fluid from the space 60 within said cylinder 29 through pipe line 66 to the space 53 within the cross slide operating cylinder 28. This will cause a movement of the cylinder 28 and corresponding movement of the cross slide 32 to the longitudinal center line of the lathe with a rapid traverse movement. This movement will be accompanied by the discharge of fluid from the space 59 through pipe line 62, through resistance valve 116 (which offers no resistance to flow in this direction), pipe lines 151, 148 and 143 back to the pump 82. It will be remembered that the capacity of the space 74 at the right of the piston 75 is less than the capacity of the space 54 within the operating cylinder 29; also that the space 60 is of less capacity than the space 53 within the operating cylinder 28. Means are provided for making up the deficit in the amount of fluid pumped to operating cylinder 29 and to operating cylinder 28. When the piston 75 has reached the end of its stroke in a right-hand direction as the parts are viewed in Figure 8, fluid within pipe lines 144, 159 and 180 will build up to a sufficient value to open resistance valve 117, delivering fluid through check valve 181 and pipe lines 184 and 68 to fill the space 54 to capacity. Likewise, when the cylinder 29 has reached the limit of its travel in an inward or retreating direction, pressure will be built up within the pipe lines 144 and 190 to a sufficient extent to open the resistance valve 120, causing the flow of fluid through the check valve 192 and pipe line 66 to fill the space 53 of cylinder 28 to capacity, resulting in the full inward movement of the cross slide 32. After the slides 21, 32 and 33 are all at the limits of their movements in retreating directions, pressure will build up sufficiently in pipe lines 144, 159, 156 and 153 to deliver fluid to the right-hand end of platen operating cylinder 76, overcoming the resistance of the resistance valve 114. Fluid will therefore be discharged from the left-hand end of cylinder 76 through said resistance valve 114 back through pipe lines 148 and 143 to the pump 82. The fluid under relatively high pressure within pipe lines 144, 159 and 156 as above mentioned will also result in the opening of the resistance valve 119, applying fluid to the left-hand end of the plunger 105 and the pilot valve 101, moving said plunger back to its right-hand position as shown in Figure 8, cutting off communication between the pipe line 112 and the control cylinder 89.

According to the layout illustrated in the drawings, the d position of the plunger 86 is not utilized. Said d position, as noted above, is the position for feeding movement in a retreating direction; or, expressed in other language, is the position for controlling the pump 82 to deliver a reduced quantity of fluid per unit of time to cause retreating movements of the slides 21, 32 and 33 and the platen 14. It will be understood without explanation that if it should be desired to utilize the position d, or if any change in the movements above specifically referred to should be desired, said changes may be accomplished by modifying the design of the cams carried by the angle member 99.

With the construction illustrated, the platen 14 will be moved in consequence of movement of the cylinder 76, until the cam 98 engages the roller 96 to move the slide 94, handle 91 and plunger 86 to position c, which is the neutral position of said plunger 86. When plunger 86 reaches position c, the pump 82 will be inoperative to deliver fluid through either the pipe lines 143 or 144. The parts will accordingly come to rest at a position corresponding to the setting of said cam 98, which, as indicated above, may correspond to a mid position of the cylinder 76 relative to the piston 77.

The restricted orifice member 176 acts as a safety device to prevent unintended movement of the plunger 105 within the pilot valve 101 in case leakage should occur past the plunger of resistance valve 115. Assuming conditions with pressure in the pipe line 143, if leakage should occur past the plunger of the valve 115 before said valve should open, said leakage may pass through restricted orifice member 176 back to the drain line 145, whereby said leakage will not cause the unintended shifting of plunger 105. However, said orifice member 176, being restricted, will not interfere with the application of the necessary pressure to said plunger 105 when resistance valve 115 has been opened. Likewise, the restricted orifice member 165 prevents the unintended shifting of plunger 105 from its left-hand position to its right-hand position. Assuming that fluid under pressure is being delivered to pipe line 144, if said fluid should leak past the plunger of resistance valve 119, said leakage fluid may pass through restricted orifice member 165 back to the drain line 145. However, said orifice member 165, being restricted, will not prevent the application of fluid pressure to the left-hand extremity of plunger 105 when resistance valve 119 is open.

The fluid pressure system, it will be noted, is entirely closed, so that dirt or foreign matter cannot have access to the fluid within said system. Assuming that the pipe lines, cylinders and other parts of the fluid pressure system are clean when the fluid is first charged into said system, there is no danger, from a practical standpoint, of clogging or other disturbances due to dirt or other foreign matter.

The present invention has the advantage that flexible or telescoping pipe connections between the source of fluid pressure and the cylinders which utilize said pressure are rendered unnecessary. Furthermore, inasmuch as the tool slide cylinders are all connected up in series with one another, no mechanical connections or other mechanisms are required for transmitting power to the various slides. A further advantage resides in the fact that reversal of the platen and tool slides from forward movement to reverse movement results from the building up of pressure. Consequently, if an abnormal resistance should be encountered in the forward or feeding movement of any of the slides, pressure will build up sufficiently in the pipe line 143 and resistance valve 115 to move the plunger 105 of the pilot valve 101 to its left-hand position, which is the position for reversing the control valve 85 to cause the delivery of fluid through the pipe line 144 to cause reverse or retreating movement of the platen and the tool slides.

One embodiment of the present invention has been described in detail. Many modifications therein will occur to those skilled in the art. It is intended that the particular disclosure shall be considered in an illustrative and not in a limiting sense. Therefore it is intended to cover all such modifications that fall within the scope of the appended claims.

What is claimed is—

1. In a machine tool, in combination, a bed, a platen movable thereon, a plurality of tool slides, fluid pressure responsive means for operating said slides, a common source of fluid pressure, pipe lines connecting said source with said fluid pressure responsive means, and control means responsive to pressure within said pipe lines for controlling the direction of flow of fluid from said source to said opuerating means, said tool slides, fluid pressure responsive means, source and pipe lines all being carried by said platen as a unit.

2. In a machine tool, in combination, a bed, a platen movable thereon, a plurality of tool slides, fluid pressure responsive means for operating said slides, a common source of fluid pressure, pipe lines connecting said source with said fluid pressure responsive means, control means responsive to pressure within said pipe lines for controlling the direction of flow of fluid from said source to said operating means, said tool slides, fluid pressure responsive means, source and pipe lines all being carried by said platen as a unit, fluid pressure responsive means carried by said platen for operating said platen, and pipe lines carried by said platen for communicating fluid pressure from said source to said last mentioned fluid pressure responsive means.

3. In a machine tool, in combination, a bed, a platen movable thereon, a plurality of tool slides, fluid pressure responsive means for operating said slides, a common source of fluid pressure, pipe lines connecting said source with said fluid pressure responsive means, control means responsive to pressure within said pipe lines for controlling the direction of flow of fluid from said source to said operating means, said tool slides, fluid pressure responsive means, source and pipe lines all being carried by said platen as a unit, fluid pressure responsive means carried by said platen for operating said platen, pipe lines carried by said platen for communicating fluid pressure from said source to said last mentioned fluid pressure responsive means, and means responsive to the movement of said platen along said bed for controlling the amount of fluid delivered per unit of time by said source.

4. In a machine tool, in combination, a bed, a platen movable thereon, a plurality of tool slides, fluid pressure responsive means for operating said slides, a common source of fluid pressure, pipe lines connecting said source with said fluid pressure responsive means, and control means responsive to pressure within said pipe lines for controlling the direction of flow of fluid from said source to said operating means, said source, pipe lines and fluid pressure responsive means being connected in a series circuit.

5. In a machine tool, in combination, a bed, a platen movable thereon, a plurality of tool slides, fluid pressure responsive means for operating said slides, a common source of fluid pressure, pipe lines connecting said source with said fluid pressure responsive means, and control means for said source responsive to pressure within said pipe lines for controlling the direction of flow of fluid from said source to said operating means, said source, pipe lines and fluid pressure responsive means being connected in a series circuit, said fluid pressure responsive means, source and pipe lines all being carried by said platen as a unit.

6. In a machine tool, in combination, a bed, a platen movable thereon, a plurality of tool slides, fluid pressure responsive means for operating said slides, a common source of fluid pressure, pipe lines connecting said source with said fluid pressure responsive means, control means for said source responsive to pressure within said pipe lines for controlling the direction of flow of fluid from said source to said operating means, said source, pipe lines and fluid pressure responsive means being connected in a series circuit, other fluid pressure responsive means carried by said platen for operating said platen, and pipe lines for communicating fluid pressure from said source to said last mentioned fluid pressure responsive means.

1. In a machine tool, in combination, a bed, a platen movable thereon, a plurality of tool slides, fluid pressure responsive means for operating said slides, a common source of fluid pressure, pipe lines connecting said source with said fluid pressure responsive means, control means for said source responsive to pressure within said pipe lines for controlling the direction of flow of fluid from said source to said operating means, said source, pipe lines and fluid pressure responsive means being connected in a series circuit, other fluid pressure responsive means carried by said platen for operating said platen, pipe lines for communicating fluid pressure from said source to said last mentioned fluid pressure responsive means, and means responsive to the movement of said platen along said bed for controlling the amount of fluid delivered per unit of time by said source.

8. In combination, a platen, a bed for carrying said platen, fluid pressure responsive means for moving said platen along said bed, tool slides, other fluid pressure responsive means for operating said tool slides, a common source of fluid pressure, pipe lines connecting said other fluid pressure responsive means in a series circuit with said source, pipe lines connecting said first mentioned fluid pressure responsive means to said source, and a resistance valve in said series circuit for stopping flow of fluid from said source to said other fluid pressure responsive means until pressure developed by said source has reached a predetermined value.

9. In combination, a platen, a bed for carrying said platen, fluid pressure responsive means for moving said platen along said bed, tool slides, other fluid pressure responsive means for operating said tool slides, a common source of fluid pressure, pipe lines connecting said other fluid pressure responsive means in a series circuit with said source, pipe lines connecting said first mentioned fluid pressure responsive means to said source, a resistance valve in said series circuit for stopping flow of fluid from said source to said other fluid pressure responsive means until pressure developed by said source has reached a predetermined value, and means responsive to movement of said platen along said bed for controlling the output of said source to control the rate of flow of fluid from said source.

10. In combination, a platen, a bed for carrying said platen, fluid pressure responsive means for moving said platen along said bed, tool slides, other fluid pressure responsive means for operating said tool slides, a common source of fluid pressure, pipe lines connecting said other fluid pressure responsive means in a series circuit with said source, pipe lines connecting said first mentioned fluid pressure responsive means to said source, a resistance valve in said series circuit for stopping flow of fluid from said source to said other fluid pressure responsive means until pressure developed by said source has reached a predetermined value, and control means for said source responsive to the pressure developed thereby for reversing the direction of flow of fluid from said source.

11. In combination, a platen, a bed for carrying said platen, fluid pressure responsive means for moving said platen along said bed, tool slides, other fluid pressure responsive means for operating said tool slides, a common source of fluid pressure, pipe lines connecting said other fluid pressure responsive means in a series circuit with said source, pipe lines connecting said first mentioned fluid pressure responsive means to said source, a resistance valve in said series circuit for stopping flow of fluid from said source to said other fluid pressure responsive means until pressure developed by said source has reached a predetermined value, means responsive to movement of said platen along said bed for controlling the output of said source to control the rate of flow of fluid from said source, and control means for said source responsive to the pressure developed thereby for reversing the direction of flow of fluid from said source.

12. In combination, a platen, a bed for carrying said platen, fluid pressure responsive means for moving said platen along said bed, tool slides, other fluid pressure responsive means for operating said tool slides, a common source of fluid pressure, pipe lines connecting said other fluid pressure responsive means in a series circuit with said source, pipe lines connecting said first mentioned fluid pressure responsive means to said source, and a resistance valve in said series circuit for stopping flow of fluid from said source to said other fluid pressure responsive means until pressure developed by said source has reached a predetermined value, said tool slides, fluid pressure responsive means, source and pipe lines all being carried by said platen as a unit.

13. In combination, a platen, a bed for carrying said platen, fluid pressure responsive means for moving said platen along said bed, tool slides, other fluid pressure responsive means for operating said tool slides, a common source of fluid pressure, pipe lines connecting said other fluid pressure responsive means in a series circuit with said source, pipe lines connecting said first mentioned fluid pressure responsive means to said source, a resistance valve in said series circuit for stopping flow of fluid from said source to said other fluid pressure responsive means until pressure developed by said source has reached a predetermined value, and means responsive to movement of said platen along said bed for controlling the output of said source to control the rate of flow of fluid from said source, said tool slides, fluid pressure responsive means, source and pipe lines all being carried by said platen as a unit.

14. In combination, a platen, a bed for carrying said platen, fluid pressure responsive means for moving said platen along said bed, tool slides, other fluid pressure responsive means for operating said tool slides, a common source of fluid pressure, pipe lines connecting said other fluid pressure responsive means in a series circuit with said source, pipe lines connecting said first mentioned fluid pressure responsive means to said source, a resistance valve in said series circuit for stopping flow of fluid from said source to said other fluid pressure responsive means until pressure developed by said source has reached a predetermined value, and control means for said source responsive to the pressure developed thereby for reversing the direction of flow of fluid from said source, said tool slides, fluid pressure responsive means, source and pipe lines all being carried by said platen as a unit.

15. In combination, a platen, a bed for carrying said platen, fluid pressure responsive means for moving said platen along said bed, tool slides, other fluid pressure responsive means for operating said tool slides, a common source of fluid pressure, pipe lines connecting said other fluid pressure responsive means in a series circuit with said source, pipe lines connecting said first mentioned fluid pressure responsive means to said source, a resistance valve in said series circuit for stopping flow of fluid from said source to said other fluid pressure responsive means until pressure developed by said source has reached a predetermined value, means responsive to movement of said platen along said bed for controlling the output of said source to control the rate of flow of fluid from said source, control means for said source responsive to the pressure developed thereby for reversing the direction of flow of fluid from said source, said tool slides, fluid pressure responsive means, source and pipe lines all being carried by said platen as a unit.

16. In combination, a supporting member, a plurality of tool slides carried thereby, a cylinder cooperatively associated with each of said tool slides, a common source of fluid pressure, pipe lines connecting said source and said cylinders in series relationship with one another, each of said cylinders having a piston movable relative thereto, the exhaust side of each of said cylinders, with the exception of the last thereof, considered in the direction of forward fluid flow from said source, being of larger capacity than the intake side of the next succeeding cylinder whereby to insure complete forward movement of said tool slides under the influence of said fluid pressure.

17. In combination, a supporting member, a plurality of tool slides carried thereby, a cylinder cooperatively associated with each of said tool slides, a common source of fluid pressure, said source being reversible, pipe lines connecting said source and said cylinders in series relationship with one another, each of said cylinders having a piston movable relative thereto, the exhaust side of each of said cylinders, with the exception of the last thereof, considered in the direction of forward fluid flow from said source, being of larger capacity than the intake side of the next succeeding cylinder whereby to insure complete forward movement of said tool slides under the influence of said fluid pressure, and other pipe lines disposed in parallel with one another between said source and all but the first of said cylinders in said series circuit considered in the direction of reverse fluid movement within said series circuit to supply sufficient fluid to said cylinders to cause corresponding reverse movement of the tool slides throughout their full ranges of travel.

18. In combination, a supporting member, a plurality of tool slides carried thereby, a cylinder for each of said tool slides, a piston within each of said cylinders, said cylinders and pistons being cooperatively associated with said tool slides, a source of fluid pressure, conduit means between said source and the inlet side of one of said cylinders, considering one direction of fluid pressure from said source, conduit means connecting the exhaust side of said one cylinder to the inlet side of another of said cylinders, and conduit means for conducting pressure from the exhaust side of said other cylinder back to said source.

19. In combination, a supporting member, a plurality of tool slides carried thereby, a cylinder for each of said tool slides, a piston within each of said cylinders, said cylinders and pistons being cooperatively associated with said tool slides, a source of fluid pressure, conduit means between said source and the inlet side of one of said cylinders considering one direction of fluid pressure from said source, conduit means connecting the exhaust side of said one cylinder to the inlet side of another of said cylinders, and conduit means for conducting pressure from the exhaust side of said other cylinder back to said source, the capacity of the outlet side of said one cylinder being greater than the capacity of the inlet side of said other cylinder.

20. In combination, a supporting member, a plurality of tool slides carried thereby, a cylinder for each of said tool slides, a piston within each of said cylinders, said cylinders and pistons being cooperatively associated with said tool slides, a source of fluid pressure, conduit means between said source and the inlet side of one of said cylinders considering one direction of fluid pressure from said source, conduit means connecting the exhaust side of said one cylinder to the inlet side of another of said cylinders, conduit means for conducting pressure from the exhaust side of said other cylinder back to said source, control means for controlling the direction of fluid movement from and to said source, and means responsive to the pressure of the fluid delivered by said source for reversing said control means.

21. In combination, a supporting member, a plurality of tool slides carried thereby, a cylinder for each of said tool slides, a piston within each of said cylinders, said cylinders and pistons being cooperatively associated with said tool slides, a source of fluid pressure, conduit means between said source and the inlet side of one of said cylinders considering one direction of fluid pressure from said source, conduit means connecting the exhaust side of said one cylinder to the inlet side of another of said cylinders, conduit means for conducting pressure from the exhaust side of said other cylinder back to said source, the capacity of the outlet side of said one cylinder being greater than the capacity of the inlet side of said other cylinder, control means for controlling the direction of fluid movement from and to said source, and means responsive to the pressure of the fluid delivered by said source for reversing said control means.

22. In combination, a supporting member, a plurality of tool slides carried thereby, a cylinder for each of said tool slides, a piston within each of said cylinders, said cylinders and pistons being cooperatively associated with said tool slides, a source of fluid pressure, conduit means between said source and the inlet side of one of said cylinders considering one direction of fluid pressure from said source, conduit means connecting the exhaust side of said one cylinder to the inlet side of another of said cylinders, conduit means for conducting pressure from the exhaust side of said other cylinder back to said source, control means for controlling the direction of fluid movement from and to said source, means responsive to the pressure of the fluid delivered by said source for reversing said control means, and a pipe line between said source and said exhaust side of said one cylinder for making up the deficit of fluid delivered back to said one cylinder in the case of reverse fluid flow from said source.

23. In combination, a supporting member, a plurality of tool slides carried thereby, a cylinder for each of said tool slides, a piston within each of said cylinders, said cylinders and pistons being cooperatively associated with said tool slides, a source of fluid pressure, conduit means between said source and the inlet side of one of said cylinders considering one direction of fluid pressure from said source, conduit means connecting the exhaust side of said one cylinder to the inlet side of another of said cylinders, conduit means for conducting pressure from the exhaust side of said other cylinder back to said source, the capacity of the outlet side of said one cylinder being greater than the capacity of the inlet side of said other cylinder, control means for controlling the direction of fluid movement from and to said source, means responsive to the pressure of the fluid delivered by said source for reversing said control means, and a pipe line between said source and said exhaust side of said one cylinder for making up the deficit of fluid delivered back to said one cylinder in the case of reverse fluid flow from said source.

24. In combination, a supporting member, a plurality of tool slides carried thereby, a cylinder for each of said tool slides, a piston within each of said cylinders, said cylinders and pistons being cooperatively associated with said tool slides, a source of fluid pressure, conduit means between said source and the inlet side of one of said cylinders considering one direction of fluid pressure from said source, conduit means connecting the exhaust side of said one cylinder to the inlet side of another of said cylinders, conduit means for conducting pressure from the exhaust side of said other cylinder back to said source, the capacity of the outlet side of said one cylinder being greater than the capacity of the inlet side of said other cylinder, and pipe lines for delivering excess fluid from the exhaust side of each of said cylinders except the last thereof back to said source.

25. In combination, a supporting member, a plurality of tool slides carried thereby, a cylinder for each of said tool slides, a piston within each of said cylinders, said cylinders and pistons being cooperatively associated with said tool slides, a source of fluid pressure, conduit means between said source and the inlet side of one of said cylinders considering one direction of fluid pressure from said source, conduit means connecting the exhaust side of said one cylinder to the inlet side of another of said cylinders, conduit means for conducting pressure from the exhaust side of said other cylinder back to said source, the capacity of the outlet side of said one cylinder being greater than the capacity of the inlet side of said other cylinder, control means for controlling the direction of fluid movement from and to said source, means responsive to the pressure of the fluid delivered by said source for reversing said control means, and pipe lines for delivering excess fluid from the exhaust side of each of said cylinders except the last thereof back to said source.

26. In combination, a supporting member, a plurality of tool slides carried thereby, a cylinder for each of said tool slides, a piston within each of said cylinders, said cylinders and pistons being cooperatively associated with said tool slides, a source of fluid pressure, conduit means between said source and the inlet side of one of said cylinders considering one direction of fluid pressure from said source, conduit means connecting the exhaust side of said one cylinder to the inlet side of another of said cylinders, conduit means for conducting pressure from the exhaust side of said other cylinder back to said source, the capacity of the outlet side of said one cylinder being greater than the capacity of the inlet side of said other cylinder, control means for controlling the direction of fluid movement from and to said source, means responsive to the pressure of the fluid delivered by said source for reversing said control means, a pipe line between said source and said exhaust side of said one cylinder for making up the deficit of fluid delivered back to said one cylinder in the case of reverse fluid flow from said source, and pipe lines for delivering excess fluid from the exhaust side of each of said cylinders except the last thereof back to said source.

27. In combination, a support, a plurality of tool slides carried thereby, a cylinder for each of said tool slides, each of said cylinders having a piston therein, said cylinders and said pistons being cooperatively associated with said tool slides, a source of fluid pressure, conduit means connecting said source of fluid pressure to one side of one of said cylinders, conduit means connecting the second side of said one cylinder to one side of another of said cylinders, conduit means connecting the second side of said other cylinder back to said source, said second side of said one cylinder having a greater capacity than said one side of said other cylinder whereby fluid delivered from said second side of said one cylinder will more than fill said one side of said other cylinder, and conduit means for conducting said excess fluid back to said source.

28. In combination, a support, a plurality of tool slides carried thereby, a cylinder for each of said tool slides, each of said cylinders having a piston therein, said cylinders and said pistons being cooperatively associated with said tool slides, a source of fluid pressure, conduit means connecting said source of fluid pressure to one side of one of said cylinders, conduit means connecting the second side of said one cylinder to one side of another of said cylinders, conduit means connecting the second side of said other cylinder back to said source, said second side of said one cylinder having a greater capacity than said one side of said other cylinder whereby fluid delivered from said second side of said one cylinder will more than fill said one side of said other cylinder, conduit means for conducting said excess fluid back to said source, and conduit means connecting said source to said second side of said one cylinder.

29. A supporting member, a plurality of tool slides carried thereby, a cylinder for each of said tool slides, each of said cylinders having a piston therein, said cylinders and said pistons being cooperatively associated with said tool slides, a source of fluid pressure, conduit means connecting said source and said cylinders in a series circuit, each of said cylinders having a first and second side relative to its corresponding piston, said source being connected through certain of said conduit means to the first side of one of said cylinders, considering fluid movement in one direction in said series circuit, said second side of each of said cylinders, except the last of said cylinders, being connected to the first side of the next succeeding cylinder in said series circuit.

30. A supporting member, a plurality of tool slides carried thereby, a cylinder for each of said tool slides, each of said cylinders having a piston therein, said cylinders and said pistons being cooperatively associated with said tool slides, a source of fluid pressure, conduit means connecting said source and said cylinders in a series circuit, each of said cylinders having a first and second side relative to its corresponding piston, said source being connected through certain of said conduit means to the first side of one of said cylinders, considering fluid movement in one direction in said series circuit, said second side of each of said cylinders, except the last of said cylinders, being connected to the first side of the next succeeding cylinder in said series circuit, said second side of each cylinder being of larger capacity than said first side of its next succeeding cylinder, conduit means including an obstruction responsive to pressure connecting said second side of each of said cylinders except the last thereof back to said source, and conduit means connecting said source with said second side of each of said cylinders except the last thereof, said last mentioned conduit means including obstructions yieldable to pressure from said source in one direction and non-yieldable to pressure in the opposite direction.

31. In a machine tool, in combination, a platen, fluid pressure responsive means for operating said platen, a plurality of tool slides carried by said platen, fluid pressure responsive means for operating each of said tool slides, a source of pressure carried by said platen, conduit means connecting said fluid pressure responsive means for said tool slides in a series circuit, control means for controlling the direction of fluid pressure delivered by said source, pilot means for reversing said control means, and a resistance valve connecting said source to said pilot means, said resistance valve having a greater resistance than is required to operate said platen and said slides under normal operation.

32. In a machine tool, in combination, a platen, fluid pressure responsive means for operating said platen, a plurality of tool slides carried by said platen, fluid pressure responsive means for operating each of said tool slides, a source of pressure carried by said platen, conduit means connecting said fluid pressure responsive means for said tool slides in a series circuit, control means for controlling the direction of fluid pressure delivered by said source, pilot means for reversing said control means, a resistance valve connecting said source to said pilot means, said resistance valve having a greater resistance than is required to operate said platen and said slides under normal operation, and a restricted orifice member for shunting back to said source fluid which has leaked past said resistance valve.

33. In a machine tool, in combination, a platen, fluid pressure responsive means for operating said platen, a plurality of tool slides carried by said platen, fluid pressure responsive means for operating each of said tool slides, a source of pressure carried by said platen, conduit means connecting said source and said fluid pressure responsive means for said tool slides in a series circuit, control means for controlling the direction of fluid pressure delivered by said source, pilot means for reversing said control means, a resistance valve adapted to connect said source to said pilot means when said source is delivering pressure in a direction to cause forward movement of said platen, a resistance valve adapted to connect said source to said pilot means when said source is delivering pressure in the opposite direction, said first mentioned resistance valve having a resistance greater than that required to move said platen and said tool slides to the limits of their forward movement under normal operating conditions, the other of said resistance valves having a resistance less than that required to move said platen to the limits of its retreating movement under normal operating conditions.

34. In a machine tool, in combination, a platen, fluid pressure responsive means for operating said platen, a plurality of tool slides carried by said platen, fluid pressure responsive means for operating each of said tool slides, a source of pressure carried by said platen, conduit means connecting said source and said fluid pressure responsive means for said tool slides in a series circuit, control means for controlling the direction of fluid pressure delivered by said source, pilot means for reversing said control means, a resistance valve adapted to connect said source to said pilot means when said source is delivering pressure in a direction to cause forward movement of said platen, a resistance valve adapted to connect said source to said pilot means when said source is delivering pressure in the opposite direction, said first mentioned resistance valve having a resistance greater than that required to move said platen and said tool slides to the limits of their forward movement under normal operating condition, the other of said resistance valves having a resistance less than that required to move said platen to the limits of its retreating movement under normal operating conditions, each of said resistance valves being provided with a restricted orifice member for conducting fluid back to said source which leaks past its said corresponding resistance valve.

35. In a lathe, in combination, a bed, a platen movable thereon, fluid pressure responsive means carried by said platen for moving said platen, tool slides carried by said platen and movable relative to said platen, fluid pressure responsive means for operating said tool slides, and a common source of fluid pressure carried by said platen for delivering fluid pressure to all of said fluid pressure responsive means.

36. In a lathe, in combination, a bed, a platen movable thereon, tool slides carried by said platen and movable relative to said platen, fluid pressure responsive means for operating said tool slides, and a common source of fluid pressure carried by said platen for delivering fluid pressure to said fluid pressure responsive means.

37. In a lathe, in combination, a bed, a platen movable thereon, tool slides carried by said platen and movable relative to said platen, fluid pressure responsive means for operating said tool slides, a common source of fluid pressure carried by said platen for delivering fluid pressure to said fluid pressure responsive means, and means responsive to resistance to movement of said slides for controlling said source to cause reversal of movement of said tool slides and said platen.

38. In a machine tool, in combination, a bed, a platen movable thereon, a plurality of tool slides carried by said platen, fluid pressure responsive means for operating said slides, a common source of fluid pressure, and pipe lines connecting said fluid pressure responsive means and said source in a series circuit.

39. In a machine tool, in combination, a bed, a platen movable thereon, a plurality of tool slides carried by said platen, fluid pressure responsive means carried by said platen for operating said tool slides, a common source of fluid pressure carried by said platen, and pipe lines carried by said platen, said source, said pipe lines and said fluid pressure responsive means being connected in a series circuit.

40. In a machine tool, in combination, a bed, a platen movable thereon, a plurality of tool slides, fluid pressure responsive means for operating said slides, a common source of fluid pressure, pipe lines connecting said source with said fluid pressure responsive means, and control means responsive to pressure within said pipe lines for controlling the direction of flow of fluid from said source to said operating means.

WILLIAM H. FOSTER.